Jan. 9, 1951     E. LAPP     2,537,310

FLUID PUMP WITH BUILT-IN INDUCTION MOTOR

Filed Nov. 29, 1946

INVENTOR:
EMIL LAPP
BY Leon M. Strauss
AGT.

Patented Jan. 9, 1951

2,537,310

UNITED STATES PATENT OFFICE 2,537,310

FLUID PUMP WITH BUILT-IN INDUCTION MOTOR

Emil Lapp, Zurich, Switzerland

Application November 29, 1946, Serial No. 713,041
In Switzerland December 13, 1945

5 Claims. (Cl. 103—87)

The present invention relates to a fluid pump with built-in induction motor whose hollow rotor, containing the pump blades, is sealed off from the wound stator by a cylindrical member made of non-rusting material.

Among the objects of the invention are to be mentioned the achievements to increase the efficiency of the pump, to diminish the wear in it, and also to obtain the smallest possible overall length.

In the fluid pump according to the invention, the rotor is supported on the shaft for rotation thereon which in turn is held in step bearings which are designed to take up any axial thrust.

Owing to this arrangement the fluid passage can be radially widened at the delivery side, i. e. at the blade rims, thus giving a correspondingly greater cross-section of fluid flow, i. e. less resistance to flow, a better efficiency of the blade rims and consequently a greater hydraulic output. Because of the large area of the step bearing, the wear caused by the axial pressure—which, as is well known, causes in general the greatest wear in pumps—is reduced to a minimum, whereby the life of the pump is correspondingly increased.

Figure 1:
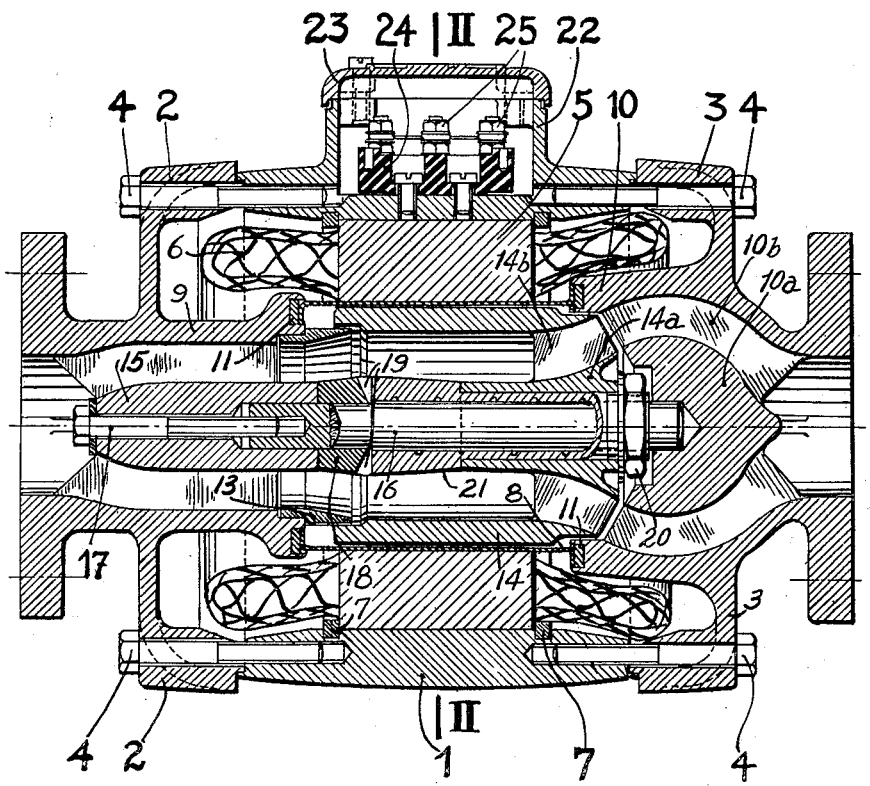
Figure 2:
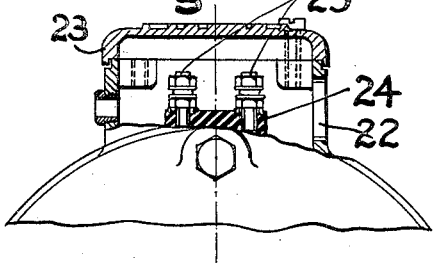

A preferred embodiment of the invention is illustrated by way of example in the accompanying drawing, in which:

Fig. 1 is a longitudinal sectional view of a fluid pump made in accordance with the invention, and Fig. 2 is a detail of the upper part of the casing and terminal box shown in vertical cross-section taken along line II—II of Fig. 1.

In the drawing numeral 1 designates the middle part of the pump casing, on whose outer ends facing the suction and delivery sides, are arranged the bearing shields or brackets 2 and 3, which are provided at their outermost ends with connecting flanges and fixedly attached to casing 1 by means of bolts 4. The laminated stator 5 carrying the winding 6 is surrounded by said middle casing part 1; the stator 5 is secured against axial displacement by means of retaining rings 7, which are recessed and let in the casing middle part 1. Within the hollow stator 5 there is inserted a sleeve or cylindrical member 8 which forms a thin-walled hollow cylinder of non-rusting material and bears with its end flanges on annular rubber gaskets 11 which in turn are embedded in correspondingly shaped grooves at both inner ends of collars 9 and 10 of the bearing brackets 2 and 3 respectively, so that a fluid-tight joint is obtained with respect to the interior of the pump. Furthermore, at the inner end of the collar 9 at the suction side, a concentric protecting ring 13 is inserted, whose free end projects into the rotor 14.

In the suction passage of the bearing shield 2 widening from the inlet opening of the collar 9 towards the rotor 14, a concentric hub 15 is disposed which is supported by means of arms within collar 9, the hub having a bore into which the shaft 16 extends which is prevented from rotating relatively to said hub by a bolt 17 which threadedly engages said shaft and passes through said hub from the outer front end thereof. A steel thrust ring 18 on shaft 16 is pressed by means of a shoulder on shaft 16 against the inner end of the hub 15 and is held firmly thereat against rotation. The thrust ring 18 has radial lubricating grooves 19 on the inner end face adjacent said shaft shoulder. The fluid passage in the rotor 14 widens radially outwards at the rear end thereof where the impeller blades 14b are located. The rear rotor hub 14a is secured on bronze sleeve 21 and against rotation relatively to the latter by means of a nut 20, said bronze sleeve 21 being rotatably fitted on a relatively large surface area of the shaft 16. The front end of the bronze sleeve 21 bears against the rear face of the thrust ring 18, so that a thrust bearing with a large surface area is provided for taking the axial thrust and is lubricated in an efficient manner by the fluid delivered, which can flow through the radial slots 19 of the thrust ring 18. Also the bronze sleeve 21 provided with radial lubricating grooves rotates with little friction on the shaft 16. The only place where wear can occur is at the rear face of the bronze sleeve 21; this wear is however very slight, owing to the large surface area and the effective lubrication, and can be compensated for, as soon as it has exceeded a certain amount, by inserting a distance ring (not show) between hub 14a and the shoulder of the bronze sleeve 21.

The rear end of the shaft 16 is supported in the bore of a pear-shaped bearing body 10a, which is supported by means of the guide blades 10b in the bearing collar 10 of the rear bearing shield 3. The fluid passage widens in radial direction concentrically to the bearing body 10a and to the impeller blades 14b, and afterwards contracts again inwardly when approaching the opposite or delivery opening. As a result of this radial change or widening of the fluid passage and the increased cross-section area thereby obtained, the advantages of a lower speed of fluid flow, avoidance of cavitation phenomena in the guide blade rim, and consequently an increase in the hydraulic efficiency of the pump are obtained.

Another advantage is that the pump can be easily and simply assembled or dismantled when this is necessary for inspection or repairs.

At the top, on the casing middle part 1, a terminal box, enclosed by a cover 23, is cast-on, in which the terminals 25 for the stator winding are located on an insulating block 24.

The protecting ring 11 prevents coarser impurities from penetrating between the rotor 14 and the partition member or sleeve 8. The lubricating grooves of the thrust ring 18 may also be arranged spirally, instead of radially.

The slotless rotor 14 made of iron is copper-plated on its jacket surface and is caused to rotate as short-circuit armature or rotor in known manner by the rotary field produced by the windings of stator 5.

It can thus be seen that there has been provided, in accordance with the present invention, a fluid pump with built-in motor and equipped with opposite bearing brackets, a housing between said bearing brackets and means joining said bearing brackets to said housing; a hollow motor rotor, impeller blades within an end portion of said hollow rotor, a stator surrounding said rotor substantially at a part of the latter preceding said end portion, a cylindrical member of non-rusting material sealing said rotor from said stator and supported in said opposite bearing brackets, said bearing brackets being provided with an inlet and a discharge end, a stationary shaft mounted within said bearing brackets and extending through said hollow rotor, means for mounting said shaft within said bearing brackets, guide blades connecting said mounting means to said bearing brackets, a sleeve bearing mounted on and slidably engaging said shaft, a thrust ring abutment on said shaft and arranged at one of the ends of said sleeve bearing, said one end of said sleeve bearing and an adjacent end of said thrust ring being enlarged with respect to the remainder of said thrust ring and of said sleeve bearing, said rotor being supported by the opposite end of said sleeve bearing, whereby axial thrust exerted against said rotor is taken up by said sleeve bearing and said thrust ring, said rotor forming at the location of said impeller blades annular passage means for a liquid in communication with said inlet and discharge end, said end portion of said rotor being located substantially beyond magnetically effective parts of said rotor and of said stator.

Having thus described my invention, it will be seen that changes and modifications may be made therein by those skilled in the art without departing from the spirit and scope of the invention and I do not wish to be limited to the details herein disclosed, but what I claim as new and desire to secure by Letters Patent is:

1. In a fluid pump with built-in motor and equipped with opposite bearing brackets, a housing between said bearing brackets and means joining said bearing brackets to said housing; a hollow motor rotor, impeller blades within an end portion of said hollow rotor, a stator surrounding said rotor substantially at a part of the latter preceding said end portion, a cylindrical member of non-rusting material sealing said rotor from said stator and supported in said opposite bearing brackets, said bearing brackets being provided with an inlet and a discharge end, a stationary shaft mounted within said bearing brackets and extending through said hollow rotor, means for mounting said shaft within said bearing brackets, guide blades connecting said mounting means to said bearing brackets, a sleeve bearing mounted on and slidably engaging said shaft, a thrust ring abutment on said shaft and arranged at one of the ends of said sleeve bearing, said one end of said sleeve bearing and an adjacent end of said thrust ring being enlarged with respect to the remainder of said thrust ring and of said sleeve bearing, said rotor being supported by the opposite end of said sleeve bearing, whereby axial thrust exerted against said rotor is taken up by said sleeve bearing and said thrust ring, said rotor forming at the location of said impeller blades annular passage means for a liquid in communication with said inlet and discharge end, said end portion of said rotor being located substantially beyond magnetically effective parts of said rotor and of said stator.

2. In a fluid pump according to claim 1, wherein said shaft is journaled adjacent said discharge end in a pear-shaped bearing body, said impeller blades of said rotor being arranged adjacent of and for cooperation with said guide blades.

3. In a fluid pump according to claim 2, wherein said guide blades and said impeller blades are positioned within an annular channel which passes from said inlet through said hollow rotor to said discharge end, the cross section of said annular channel radially widening adjacent the end of said pear-shaped bearing body.

4. In a fluid pump according to claim 1, including a conically shaped central hub fixed to said shaft and to hold said thrust ring abutment in position on the latter.

5. In a fluid pump according to claim 1, including securing means for holding said sleeve bearing adjacent the opposite end thereof in position on said shaft.

EMIL LAPP.

REFERENCES CITED

The following references are of record in the file of this patent:

UNITED STATES PATENTS

| Number | Name | Date |
|---|---|---|
| 1,609,306 | Peterson | Dec. 7, 1926 |
| 2,285,050 | Pezzillo | June 2, 1942 |
| 2,312,848 | Pezzillo | Mar. 2, 1943 |
| 2,319,730 | Garraway | May 18, 1943 |